(12) United States Patent
Neugeboren

(10) Patent No.: US 12,074,692 B2
(45) Date of Patent: Aug. 27, 2024

(54) METHOD OF MEASURING TIMING HOLDOVER PERFORMANCE IN AN R-PHY SYSTEM

(71) Applicant: ARRIS Enterprises LLC, Suwanee, GA (US)

(72) Inventor: Yair Neugeboren, Netanya (IL)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 18/115,566

(22) Filed: Feb. 28, 2023

(65) Prior Publication Data

US 2023/0283390 A1   Sep. 7, 2023

Related U.S. Application Data

(60) Provisional application No. 63/314,904, filed on Feb. 28, 2022.

(51) Int. Cl.
*H04J 3/06* (2006.01)

(52) U.S. Cl.
CPC .......... *H04J 3/0632* (2013.01); *H04J 3/0667* (2013.01)

(58) Field of Classification Search
CPC .............................. H04J 3/0632; H04J 3/0667
See application file for complete search history.

(56) References Cited

U.S. PATENT DOCUMENTS

| 7,453,897 | B2 * | 11/2008 | Enbom | H04L 65/764 370/413 |
| 7,817,677 | B2 * | 10/2010 | Black | H04L 65/1101 370/516 |
| 8,416,813 | B1 * | 4/2013 | Modi | H04J 3/0632 370/516 |
| 9,628,411 | B2 * | 4/2017 | Yang | H04N 21/6375 |
| 9,826,445 | B2 * | 11/2017 | Brisebois | H04W 36/023 |
| 2002/0172229 | A1 * | 11/2002 | Parvin | H04L 61/35 370/419 |
| 2003/0169755 | A1 * | 9/2003 | Ternovsky | H04L 12/6418 370/516 |
| 2004/0062252 | A1 * | 4/2004 | Dowdal | H04J 3/0632 370/395.62 |
| 2005/0041692 | A1 * | 2/2005 | Kallstenius | H04J 3/0667 370/503 |
| 2007/0009071 | A1 * | 1/2007 | Singh | H04L 65/80 375/354 |
| 2012/0013937 | A1 * | 1/2012 | Ashmore | H04L 47/28 358/1.15 |
| 2015/0295669 | A1 | 10/2015 | Chapman et al. | |

FOREIGN PATENT DOCUMENTS

| EP | 0987894 A2 | 3/2000 |
| EP | 1691514 A1 | 8/2006 |

OTHER PUBLICATIONS

International Search Report and Written Opinion RE: Application No. PCT/US23/14164, dated Sep. 4, 2023.

* cited by examiner

*Primary Examiner* — Bailor C Hsu
(74) *Attorney, Agent, or Firm* — Chernoff, Vilhauer, McClung & Stenzel, LLP

(57) ABSTRACT

Systems and methods for measuring the amount of drift of a clock in a remote device relative to a clock in a core, both in a distributed access architecture, by measuring the change in fullness of a dejitter buffer in the remote device that holds data provided from the core.

7 Claims, 4 Drawing Sheets

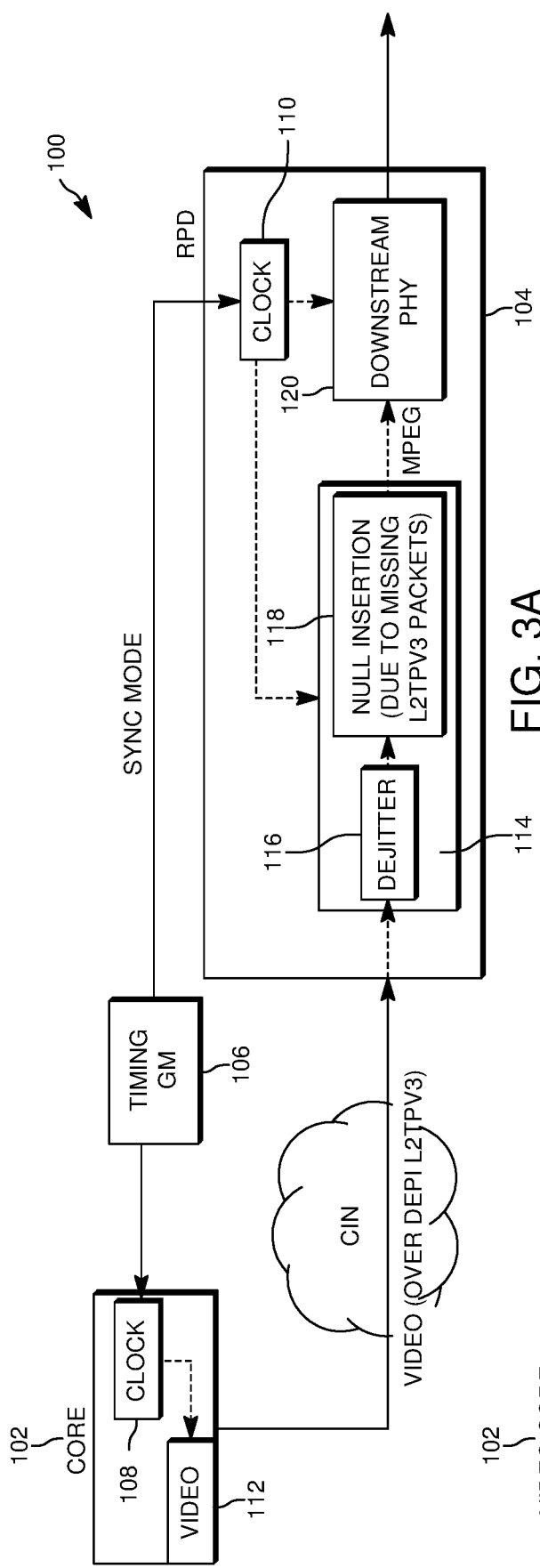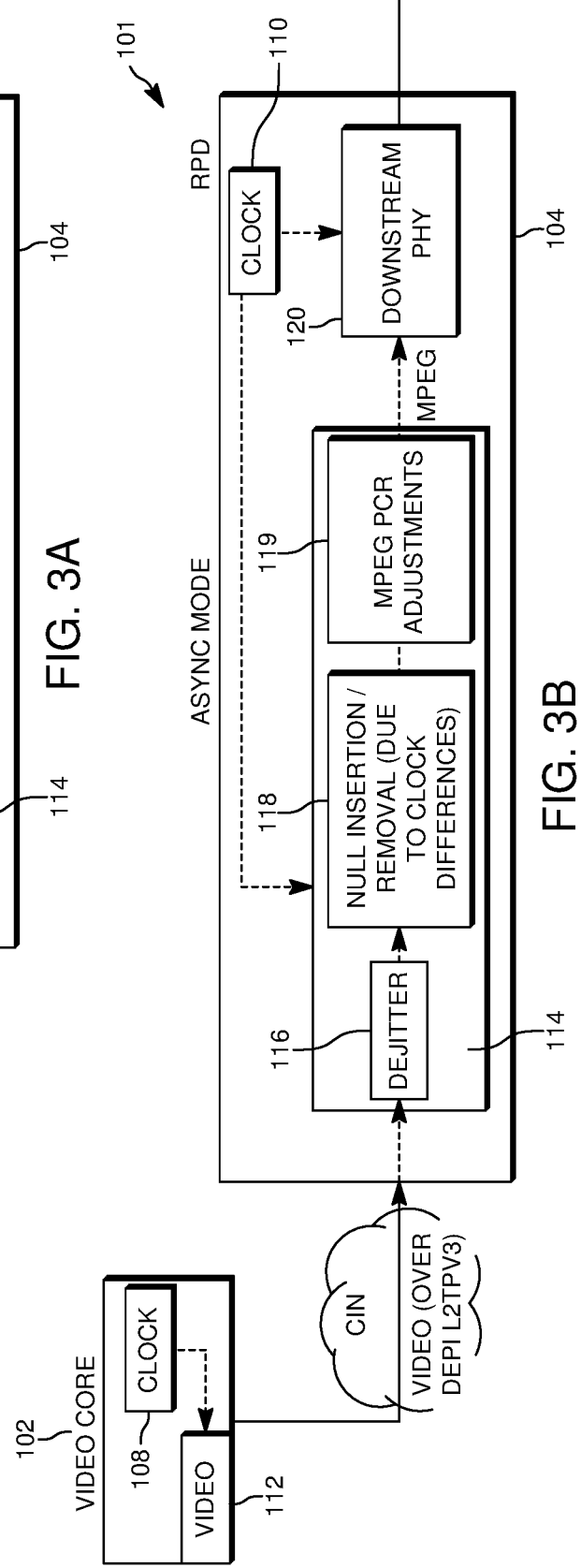

METHOD OF MEASURING TIMING HOLDOVER PERFORMANCE IN AN R-PHY SYSTEM

CROSS REFERENCE TO RELATED APPLICATIONS

The present application claims priority to U.S. Provisional Application No. 63/314,904 filed Feb. 28, 2022, the content of which is incorporated herein by reference in its entirety.

BACKGROUND

The subject matter of this application generally relates to delivery of video content using distributed access architectures (DAA) of a hybrid CATV network, and more particularly to architectures that distribute the functions of the Cable Modem Termination System between a core and a remote device synchronized to the core, such as a Remote PHY device or Remote MACPHY device.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content terminates as RF signals over coaxial cables, but is transmitted over the bulk of the distance between the content provider and the subscriber using optical signals. Specifically, CATV networks include a head end at the content provider for receiving signals representing many channels of content, multiplexing them, and distributing them along a fiber-optic network to one or more nodes, each proximate a group of subscribers. The node then de-multiplexes the received optical signal and converts it to an RF signal so that it can be received by viewers. The system in a head end that provides the video channels to a subscriber typically comprises a plurality of EdgeQAM units operating on different frequency bands that are combined and multiplexed before being output onto the HFC network.

A traditional HFC architecture includes a head end having a Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern HFC CATV systems have combined the functionality of the CMTS with the video delivery system in a single platform called the Converged Cable Access Platform (CCAP).

In these traditional HFC architectures, the video is modulated onto the RF network by a video Edge QAM (VEQ). A VEQ receives Internet-Protocol (IP) encapsulated Single & Multiple Program Transport Streams (SPTSs & MPTSs) from various sources (unicast/multicast) and, after removing any jitter from the network ingress stream, statically or dynamically maps these streams onto a QAM channel via one or more ports of the VEQ, remapping program identifiers (PIDs), while multiplexing as necessary individual SPTSs into a single MPTS. The VEQ may also perform local encryption of the video's elementary streams (ESs).

As networks have expanded and head ends have therefore become increasingly congested with equipment, many content providers have recently used distributed architectures to spread the functionality of the CMTS/CCAP throughout the network. This distributed architecture keeps the cable data and video signals in digital format as long as possible, extending the digital signals beyond the CMTS/CCAP deep into the network before converting them to RF. It does so by replacing the analog links between the head end and the access network with a digital fiber (Ethernet/PON) connection.

One such distributed architecture is Remote PHY (R-PHY) distributed access architecture that relocates the physical layer (PHY) of a traditional CMTS or CCAP—including the VEQs—by pushing the physical layer to the network's fiber nodes. Thus, while the core in the CMTS/CCAP performs the higher layer processing, the R-PHY device in the node converts downstream video data packets sent by the core from digital to analog to be transmitted on radio frequency, and also converts the upstream RF data sent by cable modems from analog to digital format to be transmitted optically to the core. Another distributed access architecture is Remote MAC PHY (R-MACPHY) where, not only is the physical layer of the traditional CMTS pushed into the network, but the functionality Media Access Control (MAC) layer, which is one of the two layers that constitute the data link layer of a transport stream, is also assigned to one or more nodes in the network in what is called a Remote MACPHY device (RMD).

In DAA architectures, it is therefore the remote video capable devices, such as an RMD and RPD, that include the VEQs that modulate a fully formed MPTS stream, sent by a core, onto the RF network. One benefit of this arrangement is that RMD/RPD devices are generally lower power than a traditional Video Edge QAMs located in a head end, and need lower computational and memory resources. Similar to a VEQ located in a head end, a VEQ located in an RPD/RMD must map and modulate an IP-encapsulated, fully formed MPTS video stream it receives from a head end onto one or more QAM channels (one stream per channel), removing network jitter in the process. The difference relative to a VEQ in a head end, however, is that a VEQ in a remote device only receives a fully-encapsulated MPTS stream, hence does not need to multiplex together various SPTS content.

In DAA architectures, however, because the functionality of the CMTS/CCAP is divided between a core in the head end and various PHY or MACPHY devices throughout the network, protocols must be established to accurately preserve the timing of reconstructed video data that is communicated throughout the network. Thus, even though a remote device only receives MPTS video data already synchronized together, the remote device still must account for any difference between the clock rate at which it receives data and the clock rate at which it outputs data. For example, the DAA remote device may not be synchronized to the same time base as that of the CCAP core (asynchronous operation), or even when the CCAP core and the remote device are synchronized to a common clock (synchronous operation), the CCAP core and the remote device may lose their timing lock.

In synchronous mode, so long as the clock of the remote device and the core(s) are locked together, no significant challenge is posed. However, problems arise during holdover when wither the remote device or the core loses the connection to a timing source. During holdover the remote device will drift in frequency and phase relative to the core. The remote DOCSIS Timing Interface (R-DTI) requires the remote device to provide a notification when it exceeds a specified amount of drift, but remote devices are often not able to accurately measure that amount of drift.

What is desired therefore, are improved systems and methods for accurately determining the amount of drift of a remote device relative to a core in distributed access architectures.

BRIEF DESCRIPTION OF THE DRAWINGS

For a better understanding of the invention, and to show how the same may be carried into effect, reference will now be made, by way of example, to the accompanying drawings, in which:

FIG. 3A shows an exemplary system where the video/CCAP core of FIG. 2 transmits video data to the RPD in sync mode.

FIG. 3B shows an exemplary system where the video/CCAP core of FIG. 2 transmits video data to the RPD in async mode.

DETAILED DESCRIPTION

The disclosed systems and methods will be described using a distributed access architecture that provides video and data, but those of ordinary skill in the art will appreciate that the disclosed embodiments may be used in other synchronized architectures that are subject to holdover, and that provide data to a remote device that is stored in a dejitter buffer.

Figure 1:
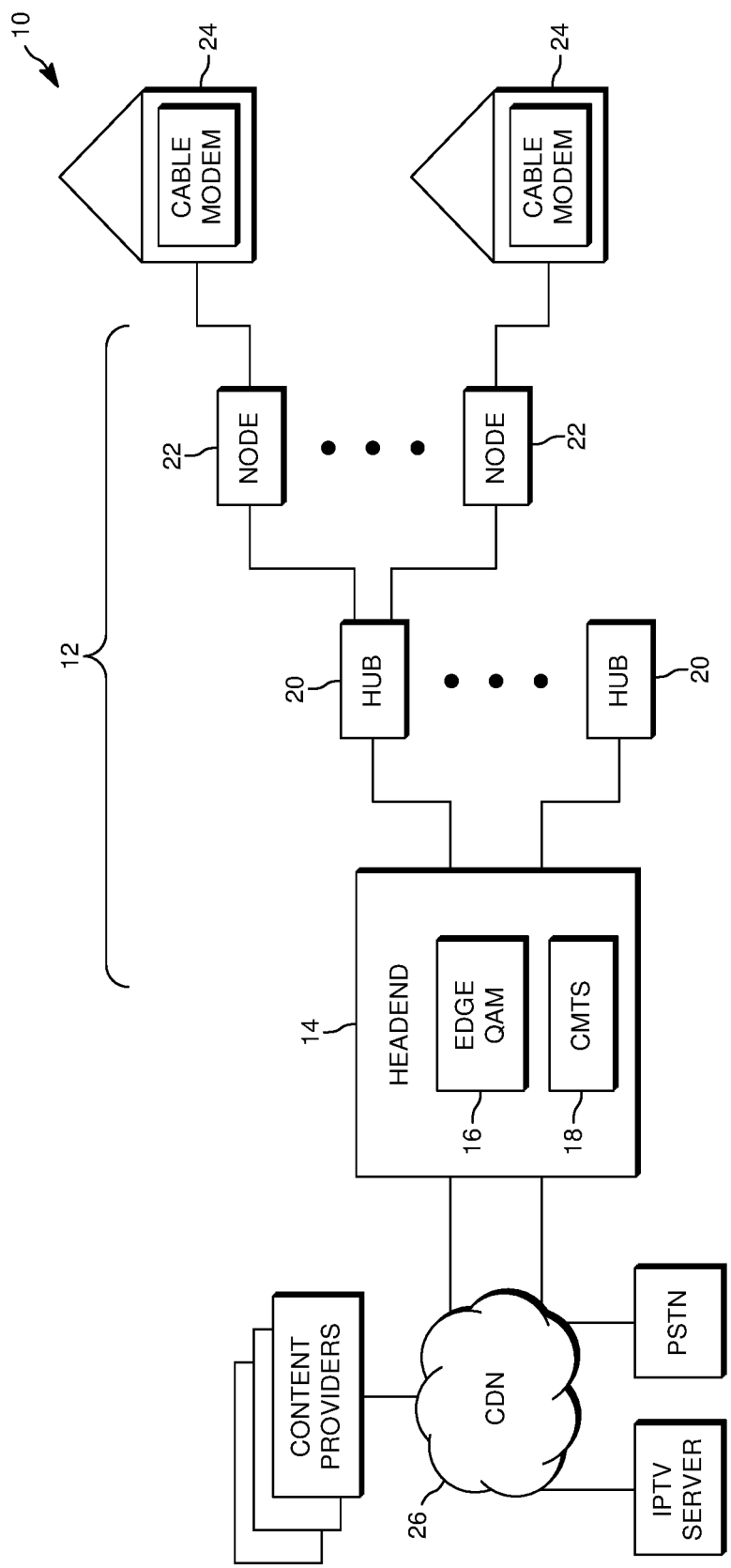
FIG. 1 shows an exemplary traditional HFC architecture having video EQAM units, which package MPTS transport streams to send to downstream nodes.

As noted previously, video EQAM (VEQ) devices are used to receive a large number of channels of video, and output an RF-modulated (i.e., QAM or quadrature amplitude modulated) signal combining the multiple different channels that the VEQ receives. FIG. 1, for example, shows a traditional architecture 10 by which an HFC network 12 includes a head end 14 that delivers content to subscriber equipment 24 as subscriber premises, shown in the figure as a cable modem but those of ordinary skill in the art will understand that subscriber equipment could include set-top boxes, gateways, wireless phones, computers, etc.

The HFC network 12 includes a head end 14, a plurality of hubs 20, and associated with each hub, a plurality of nodes 22 and a plurality of subscriber equipment 24 such as cable modems. The head end 14 typically includes a cable modem termination system (CMTS) 13 and a plurality of video EQAM units 16. Each of the nodes 22 has one or more corresponding access points, and each subscriber may have one or more corresponding network elements 24, shown in FIG. 1 as a cable modem.

As also noted previously, in these traditional HFC architectures 10, video is modulated onto the RF network by VEQs 16, which receives Internet-Protocol (IP) encapsulated Single & Multiple Program Transport Streams (SPTSs & MPTSs) from various sources (content providers, etc.) through content delivery network 26. The content delivery network is typically a switching network by which packetized IP data is routed from one address to another and may exhibit unpredictable and variable delays in the packets received. Therefore, the VEQ 16 preferably removes this jitter from the network ingress stream before mapping and modulating the video data onto a plurality of QAM channels. As also noted earlier, to deliver an MPTS stream onto a QAM channel in accordance with ISO 13818-1 requires that the VEQ recover the ingress Program Clock Reference (PCR) values encoded within each transport stream and re-stamp it with the VEQ's internal 27 MHz clock so that all streams are delivered with the same time base.

Figure 2:
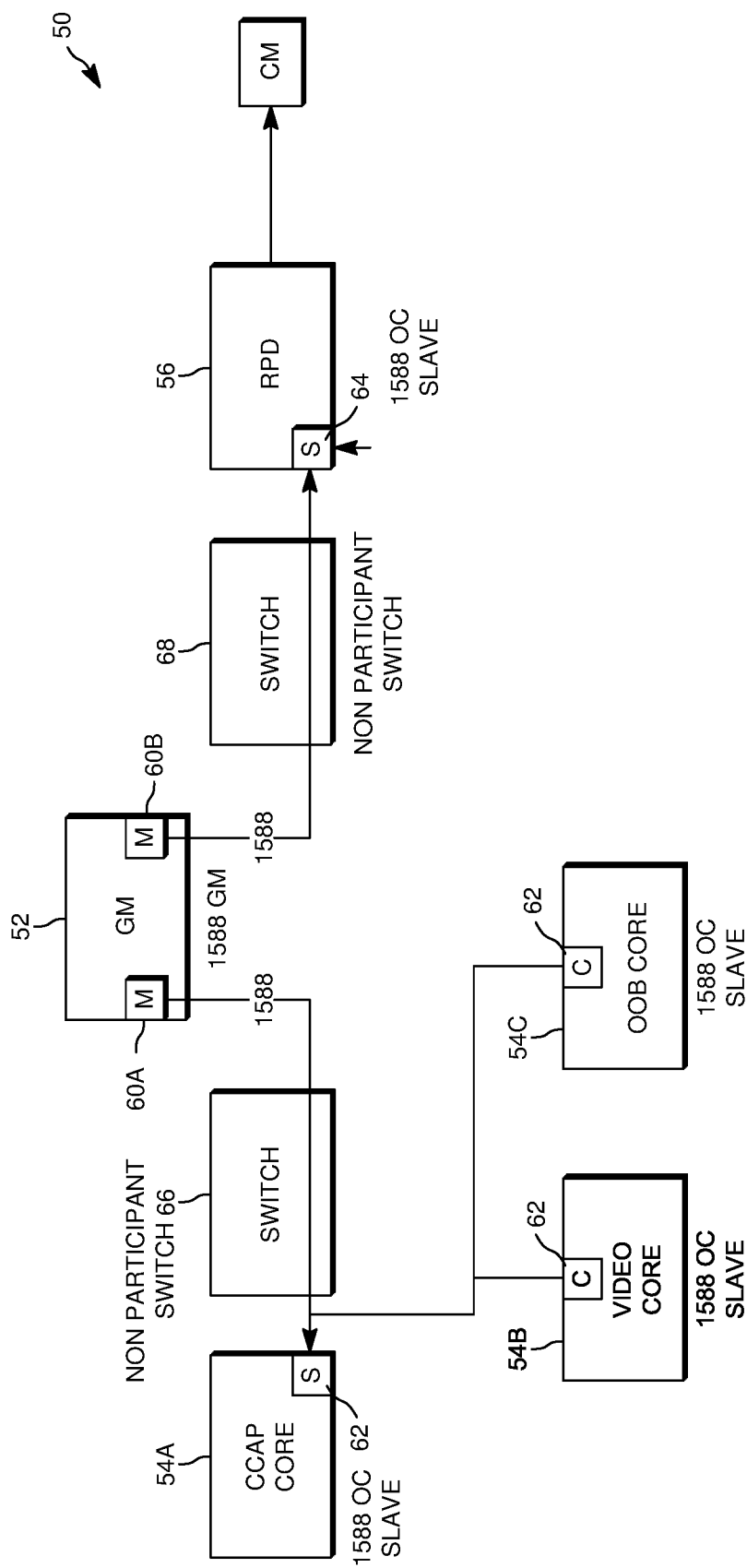
FIG. 2 shows an exemplary architecture that includes a plurality of cores, that each send data and/or video to a remote physical device (RPD).

FIG. 2 shows an alternate distributed access architecture (DAA) in which some of the functionality of the VEQ is moved to a node. Specifically, FIG. 2 shows what is known as n Remote-Physical Architecture (R-PHY) 50 in which one or more of cores, such as a CCAP core 54a, a video core 54b, an OOB core 54c, etc., send data to a Remote Physical Device (RPD) 56, which is in turn connected to one or more "consumer premises equipment (CPE) devices 18 such as a set-top box, cable modem, etc. Though an R-PHY architecture is illustrated in FIG. 2, it should be understood that the description herein may be equally applicable to other DAA architectures, such as R-MACPHY architectures, for example. In some embodiments, a timing grandmaster device 52 may be available to provide timing information to both the video/CCAP/OOB cores 54a-54c and the RPD 56. Specifically, the timing grandmaster 52 has a first master port 60a connected to slave clocks 62 in the CCAP core 54 and a second master port 60b connected to slave clock 64 in the RPD 56, though alternatively the respective slave clocks 64 of the core 54a-54c and the RPD 56 may both be connected to a single master port in the timing grandmaster device 52. The cores 54a-54c may be connected to the timing grandmaster 52 through one or more switches 66 while the RPD 56 may be connected to the timing grandmaster 52 through one or more switches 68. Although FIG. 2 shows only one RPD 56 connected to the timing grandmaster 52, many such RPDs may be simultaneously connected to the grandmaster 52, with each RPD having a slave clock 64 receiving timing information from a port 60b in the grandmaster clock 52.

Even though the architecture of FIG. 2 shows a common grandmaster device 52 capable of synchronizing the video/CCAP/OOB cores 54a-54c to the RPD 56, the architecture of FIG. 2 may be also configured to operate asynchronously with respect to video data, where the grandmaster device 52 does not send common timing information to the RPD 56 relative to the video core 54b. For example, the RPD 56 may be configured to operate asynchronously if the video core 54b does not support IEEE1588 timing protocols, or if the RPD 56 is desired to be more resilient to holdover periods in the case the RPD and/or the core loses connection to the timing grandmaster and a specified threshold amount of drift is exceeded. Moreover, in an R-MACPHY system, an RMD will typically be set to async mode by default to eliminate the need for 1588 timing, since DOCSIS services do not need it although the RMD may be switched to sync mode if other services such as wireless backhaul requires IEEE 1588 services, or if the oscillator of the video core 54b is of poor quality and needs an external timing source. Therefore, the system shown in FIG. 2 may be configured to either operate in sync mode or in async mode to process video content, and the video core 54b and RPD (RMD) 55 each therefore may in some embodiments include hardware capable of operating in either mode, with software that enables configuration by a video core of itself and connected downstream devices into either alternate one of these modes when setting up video channels.

In sync (synchronous) mode, the RPD (or RMD) and its video core 102 are synchronized in time to the same reference clock. In this sync mode, the RPD is required to detect lost video packets using the Layer 2 Tunneling Protocol v. 3 (L2TPv3) sequence number monitoring, and insert MPEG null packets for each missing packet. FIG. 3, for example, shows a system in a configuration 100 where a video core 102 communicates with an RPD 104 in synchronous mode using a common grandmaster timing server 106. The timing server 106 maintains an identical timing lock (i.e. frequency and phase) with both the clock 108 in the video core 102 and the clock 110 in the RPD 104. The video core 102 has a video streamer 112 that forwards video data packet to the RPD 104 via a Downstream External PHY Interface (DEPI) using L2TPv3. The video packets sent from the video core 102 to the RPD 104 will typically include all information necessary to decode the packetized elementary video transport stream, such as Program Identifiers (PIDs), Program Clock Reference (PCR) data, etc.

The RPD 110 in turn, receives the video packets sent from the video core 108 in a dejitter buffer 116 of a processing device 114. The dejitter buffer 116 receives and outputs packet data at a rate that removes network jitter resulting from differing paths of received packet data, or other sources of varying network delay between the video core and the RPD. Because some packets sent by the video streamer 112 may be lost or misplaced during transport to the RPD 104, the packets output from the dejitter buffer 116 may preferably be forwarded to a module 118 that, in the case of sync mode, inserts null packets in the data stream to account for those lost packets, so as to maintain the proper timing rate of the transmitted video. The transport stream, with any necessary insertion of null packets is then forwarded to a PHY device 120, which may decode the packetized elementary stream into a sequence of decoded video frames for downstream delivery to end-users by outputting QAM-modulated data in a format expected by customer-premises equipment, like set-top boxes. Alternatively, the PHY device may simply forward the packetized data, without decoding, to e.g., a cable modem for decoding by a user device such as a computer, tablet, cell phone, etc.

In sync mode, because the RPD 104 and its Video Core 102 must be synchronized to the same reference clock, the frequency of the PCR clock contained within the ingress MPTS matches that of the local clock on the remote device. Therefore, there is no frequency offset on the RPD between the ingress and egress streams, and as noted earlier, to maintain proper timing information in the video data being transmitted, the RPD 104 need only remove network jitter, detect lost video packets using the L2TPv3 Sequence number monitoring, and insert MPEG NULL packets for each missing packet.

Alternatively, however, the RPD and video core may be configured to operate in an asynchronous (async) mode. In async mode, the RPD 104 and its video core 102 are not synchronized in time to the same reference clock. Instead, the RPD 104 is required to detect the difference between its own clock 110 and the clock 108 of the video core 102 and be able to either insert or remove MPEG packets as necessary to maintain expected MPEG bitrate, and also adjust the MPEG PCR values due to the removal/insertion of the MPEG packets.

FIG. 3B, for example, shows the hardware of FIG. 2 configured to instead operate in async mode. In this configuration 101, the clock 108 of the video core 102 and the clock 110 of the RPD 104 are not synchronized and may therefore drift relative to each other. The video streamer 112 of the video core 102 forwards packets of the packetized video data elementary stream to the RPD 104, which again receives the data in dejitter buffer 116 to remove network jitter, as described previously. However, unlike the configuration of FIG. 2, the packets output from the dejitter buffer 116 are forwarded to the module 118 which both adds null packets when needed, and drops packets when needed, in order to maintain the proper constant bit rate of the data received from the dejitter buffer 116.

Further, because the RPD and its video core are not synchronized in time to the same reference clock, the frequency of the PCR in the ingress MPTS will be offset from that of local RPD clock. Thus, as well as performing the above functions common to those performed in sync mode, the RPD must also detect the magnitude of the frequency offset from the video core and correct for it. To this end, after packets are added/dropped as needed, a PCR module 119 re-stamps the video packets with updated PCRs due to the removal/insertion of MPEG packets before forwarding the re-stamped packets to the PHY device 120.

As noted previously, in distributed access architectures, the remote device such as an RPD is typically configured to operate in sync mode with respect to a video core, where the RPD and video core maintain a timing lock, and synchronization must be maintained by both frequency and phase in order for DOCSIS time scheduling to properly function. Also, the remote device such as an RPD is configured to maintain a timing lock with data cores, such as CCAP core 54a and OOB core 54c in FIG. 2. For example, the Remote DTI (R-DTI) specification requires that an RPD and CCAP core to be phase aligned with less than 1 ms difference and the R-PHY specification specifies IEEE-1588 as the method to perform this frequency and phase synchronization in a R-PHY system.

While the remote device and the core(s) maintain a timing lock, no significant difficulties arise; however, problems occur whenever the remote device or the core loses connection to a common timing source, such as a grandmaster timer or otherwise lose synchronization with each other. In this instance the RPD enters what is called "holdover" where the remote device will drift in frequency and phase relative to the core(s). The magnitude of this drift is dependent on many factors such as temperature variations, internal oscillator performance, etc. For example, an RPD with a typical TCXO oscillator might drift 1 ms in phase within few hours, and in a worst case scenario, even in several minutes. With respect to video delivery, an RPD in holdover may simply switch operation to async mode. However, when the phase difference between a clock of a remote device and that of its core grows too large during holdover, cable modems may go offline, and therefore the R-DTI specification provides for a notification from a remote device such as an RPD when its drift during holdover exceeds a specified threshold.

Usually, holdover issues are addressed by attempting to improve holdover performance either through use of a better oscillator or having frequency assistance from the network (SyncE) to avoid frequency drift. However, both of these solutions are costly both in power and price. In addition, SyncE requires that the network support it, which in many cases is not present.

As just noted, the R-DTI specification provides for a notification from a remote device such as an RPD when its drift during holdover exceeds a specified threshold, but this specification does not provide a mechanism for how the RPD should detect the magnitude of its drift. Ordinarily, a device in holdover is not able to measure the magnitude of its own drift, since it lost its time reference, and therefore the typical method to determine the amount of drift is to simply presume that the remote device has crossed the threshold after a predetermined time has passed during holdover, the amount of time based on the hardware characteristics of the clock or oscillator in the remote device.

The present disclosure provides a novel mechanism by which a remote device may measure the amount of drift that has occurred during holdover, in real time. Specifically, the embodiments disclosed in this specification take advantage of the fact that, even though data services cannot operate indefinitely without synchronization to the date core, video services can. Accordingly, the present specification describes embodiments that allow a remote device such as an RPD to detect a fractional frequency offset relative to a core by detection and analysis of fluctuations in the bitrate of incoming video or other data streams from the video core while in holdover. The video stream from the video core in a distributed architecture is preferably configured to transmit video data at constant bitrate (CBR) based on the video core clock e.g., a 27 MHz MPEG clock (which is locked to the reference clock in synchronous mode).

On the assumption that the data core, such as core 54a or 54c of FIG. 2, is still locked to the reference clock while the RPD is in holdover, and while the RPD operates in async mode during holdover (either because the RPD id configured to operate in async mode or because the RPD switches to async mode upon entering holdover from sync mode), any frequency drift between that assumed frequency of the MPEG clocks and the remote device will be reflected by bit rate fluctuations of the video stream as detected by the remote device, which for purposes of this specification will be presumed to be an RPD but those of ordinary skill in the art will realize that it may be another remote device, such as an RMD.

The RPD preferably includes a video dejitter buffer such as the buffer 116 of FIG. 3 that can hold at least 10 ms of video packets. When the RPD and the video core clocks are synced, any fluctuations in the buffer depth are caused by network jitter. When the RPD and the video core are not in sync due to the RPD going into holdover, the clock drift in the RPD will result in additional fluctuations of the buffer depth. However, the network fluctuation caused by network jitter is much higher in frequency that fluctuations caused by frequency drift; therefore, the RPD can perform low pass filtering (LPF) techniques to filter out the fluctuations caused by network jitter. What remains is fluctuations that represents drift.

Thus, in preferred embodiments, the disclosed systems and methods may include a remote device that measures buffer depth fluctuations, applies a low pass filter to those fluctuations, and uses the filtered results to calculate the bitrate difference between the nominal configured bitrate and the actual bitrate of the video stream and derive the fractional frequency offset between its own clock and the PCR clock of the incoming MPEG stream.

As already noted, network jitter is removed by using a 'dejitter' buffer 116 shown in FIG. 3. This dejitter buffer 116 is preferably filled initially to its mid-point as the MPTS stream delivery starts. Dejitter is usually accomplished using a low-pass filter that averages delays over a sufficiently-long interval, hence the dejitter buffer 116 is preferably sized large enough to absorb the fluctuations in the buffer depth caused by jitter on the ingress stream without underflowing or overflowing.

Frequency differences between the ingress PCR and the local RPD clock (i.e. the egress rate) will manifest as a drift on the de-jitter buffer depth after low-pass filtering. This will produce the drift rate of the queue depth caused by the frequency offset. This drift rate is directly proportional to the offset between frequencies of the ingress PCR and that of the local clock of the remote device. Specifically, ingress frequency Fi is directly proportional to the ingress bitrate Bi $$F_i \alpha B_i$$

and the output frequency Fo is directly proportional to the egress bitrate Bo $$F_0 \alpha B_0$$

where the differential between the ingress and egress frequencies is expressed in terms of a dimensionless parts-per-billion (PPM) frequency offset.

$$\frac{F_1 - F_0}{F_0} \times 10^9 = \Delta ppb.$$

The rate of change of the buffer depth is also proportional to the bitrate difference dB/dt. Therefore, $$\frac{dB}{dt} = \frac{\Delta ppb}{10^9} Bi. \qquad \text{(Eqn. 1)}$$

Knowing the fractional frequency offset is not sufficient due to the cumulative effect of the frequency drift on the phase drift. Accordingly, in preferred embodiments, the RPD will measure the Fractional Frequency Offset (FFO) rapidly (e.g., every few seconds) and perform an integral function on all the FFO measurements to estimate the total phase drift. It should be noted that the FFO value can be positive or negative.

$$\text{Phase Drift} = \int_0^t (FFO) dt \qquad \text{(Eqn. 2)}$$

Once the estimated phase drift crosses a predefined threshold, the RPD can send out a notification that its holdover is out of specification.

Figure 4:
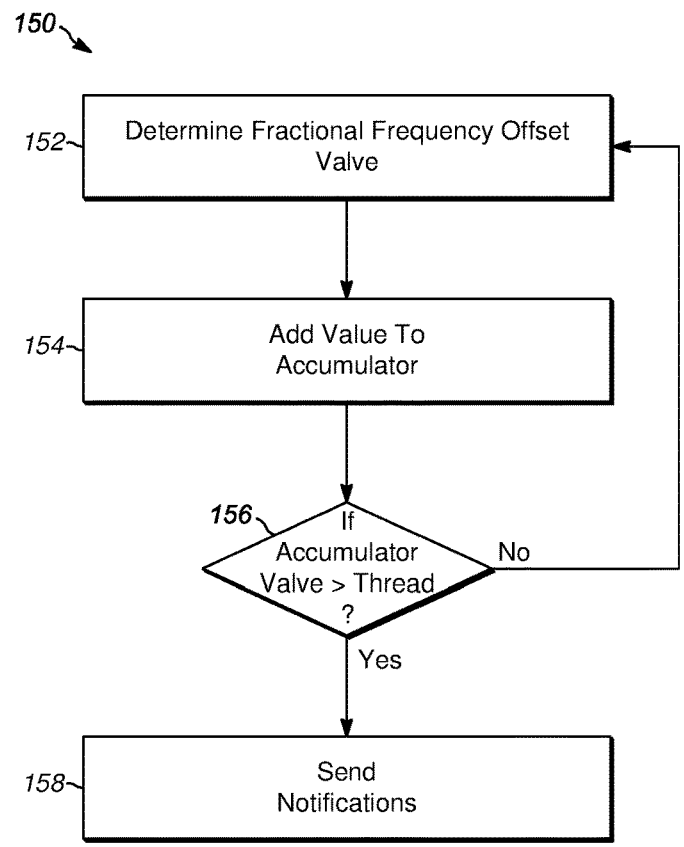
FIG. 4 shows an exemplary method according to some embodiments of the present disclosure.

FIG. 4 shows an exemplary method 150 that implements the foregoing procedure. The method 150 is preferably implemented in, or upon data recovered from, a remote device in a distributed access architecture. For example, in one embodiment, the method 150 may be implemented in a processing device housed within an RPD 104 such as is shown in FIG. 3. In alternative embodiments, some or all of the steps shown in FIG. 4 may be implemented in a server based on data collected from a remote device, such as the RPD 104 of FIG. 3.

At step 152 a fractional frequency offset (FFO) value is determined. At step 154 the determined value is added to an accumulator, i.e., a function that accumulates prior FFO values. At step 156 it is determined whether the accumulated value exceeds a threshold. Those of ordinary skill in the art will appreciate that appropriate values for the threshold will change depending on, for example, the accuracy of hardware such as an oscillator in a remote device such as RPD 104. If the threshold has been exceeded, then at step 158 a notification is sent. If the accumulated value determined at step 156 does not exceed the appropriate threshold, the method returns to step 152 and another FFO value is determined, added to an accumulator at step 154 and so forth.

Figure 5:
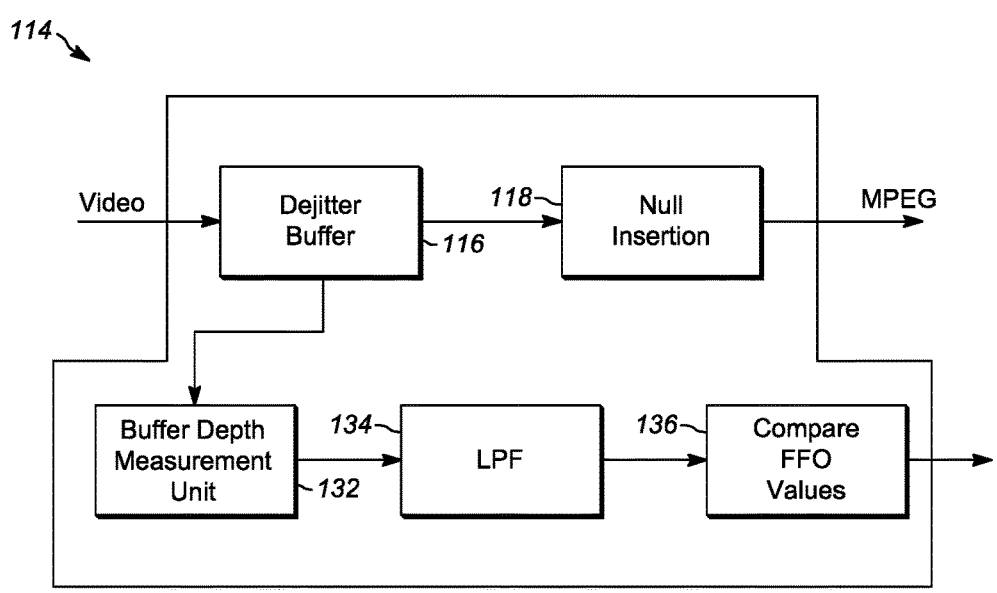
FIG. 5 shows an exemplary apparatus that provides input data for the method of FIG. 4.

FIG. 5 shows one preferred system for outputting FFO values. FIG. 5 shows an embodiment having the processing device 114 of FIG. 3, along with its dejitter buffer 116. A Buffer Depth Measurement Unit 132 receives data from the dejitter buffer 116 comprising a series of measurements representing a time series of values of the depth of the dejitter buffer 116 i.e., how full the dejitter buffer 116 is. The output of Buffer Depth Measurement Unit 132 is then preferably provided to a low pass filter 134 configured to filter out the high-frequency variations in buffer depth due to network jitter. The output of the low pass filter 134 then is provided to unit 136 that computes a sequence of FFO values used in the method of FIG. 4. The sequence of FFO values are calculated as the rate of change (positive or negative) of the filtered output of the low pass filter 134 as previously described.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A remote device in a distributed access architecture of a communications network, the remote device operatively connected to a core providing data to the remote device, the remote device including a dejitter buffer and a processor configured to measure sequential values, each value representing an instantaneous fullness state of the dejitter buffer, and use the values to determine a magnitude of phase drift of a first clock of the remote device relative to a second clock of the core;
   the remote device including a low pass filter that filters the sequential values; and
   where the output of the low pass filter is used to determine a sequence of fractional frequency offset values.

2. The remote device of claim 1 where the processor accumulates the sequence of fractional frequency offset values to provide an accumulated value and compares the accumulated value to a threshold.

3. The remote device of claim 2 where the remote device provides an alert based on the comparison.

4. A method implemented by a processor of a network device in a distributed access architecture, the method comprising:
   measuring sequential values representing a fullness state of a dejitter buffer of the network device, the network device having a first clock;
   using the sequential values to determine a magnitude of phase drift of the first clock relative to a second clock associated with a second device providing data to the dejitter buffer;
   applying a low pass filter to the sequential values;
   where the output of the low pass filter is used to determine a sequence of fractional frequency offset values.

5. The method of claim 4 further comprising accumulating the sequence of fractional frequency offset values to provide an accumulated value.

6. The method of claim 5 further comprising comparing the accumulated value to a threshold.

7. The method of claim 6 further comprising providing an alert based on the comparison.

* * * * *